(12) United States Patent
Laarman et al.

(10) Patent No.: US 6,736,420 B2
(45) Date of Patent: May 18, 2004

(54) CARRIER ASSEMBLY FOR A FIFTH WHEEL

(75) Inventors: Gregory A. Laarman, Holland, MI (US); Jose Alguera, New-Isenburg (DE)

(73) Assignee: Jost International Corporation, Grand Haven, MI (US)

( * ) Notice: Subject to any disclaimer, the term of this patent is extended or adjusted under 35 U.S.C. 154(b) by 0 days.

(21) Appl. No.: 10/231,781

(22) Filed: Aug. 28, 2002

(65) Prior Publication Data

US 2003/0001361 A1 Jan. 2, 2003

Related U.S. Application Data

(62) Division of application No. 09/613,329, filed on Jul. 7, 2000, now abandoned.
(60) Provisional application No. 60/186,838, filed on Mar. 3, 2000.

(51) Int. Cl.[7] ............................................. B62D 53/06
(52) U.S. Cl. ................. 280/438.1; 280/433; 280/407
(58) Field of Search ............................. 280/433, 434, 280/435, 436, 437, 407, 438.1, 441

(56) References Cited

U.S. PATENT DOCUMENTS

| | | | |
|---|---|---|---|
| 3,606,384 A | * 9/1971 | Fontaine et al. ............ 280/407 |
| 3,722,914 A | 3/1973 | Walther |
| 3,861,709 A | 1/1975 | Mulcahy et al. |
| 3,893,710 A | 7/1975 | Madura |
| 4,443,025 A | * 4/1984 | Martin et al. ............... 280/407 |
| 4,946,183 A | * 8/1990 | Benson et al. .............. 280/434 |
| 5,344,173 A | 9/1994 | Beeler et al. |
| 5,639,106 A | 6/1997 | Vitale et al. |
| 5,746,438 A | 5/1998 | Bergmann et al. |
| 5,765,849 A | 6/1998 | Moulton et al. |
| 5,915,713 A | 6/1999 | Kniep |
| 6,352,277 B1 | * 3/2002 | Timmings .................. 280/437 |
| 6,402,176 B1 | * 6/2002 | Timmings .................. 280/433 |
| 6,488,305 B2 | * 12/2002 | Laarman .................. 280/438.1 |
| 2002/0125684 A1 | * 9/2002 | Laarman ..................... 280/433 |

FOREIGN PATENT DOCUMENTS

| | | | | |
|---|---|---|---|---|
| DE | 2 511 965 A1 | 3/1983 | | |
| DE | 3134765 A | * 3/1983 | ........... B62D/53/08 |
| DE | 3518540 A1 | 11/1986 | | |
| DE | 3530467 A1 | 3/1987 | | |
| DE | 3741330 A1 | 6/1989 | | |
| EP | 0 244 197 A1 | 11/1986 | | |
| EP | 0 380 718 | 1/1989 | | |
| EP | 0 481 928 A1 | 10/1991 | | |
| EP | 0 509 137 A1 | 10/1991 | | |
| EP | 0503954 A1 | 9/1992 | | |
| EP | 544268 A1 | * 6/1993 | ........... B62D/53/12 |
| EP | 0 616 939 A1 | 2/1994 | | |
| GB | 2160163 A | * 12/1985 | ........... B62D/53/10 |
| JP | 55123572 A | * 9/1980 | ........... B62D/53/08 |
| WO | WO 01/21469 A2 | 3/2001 | | |

* cited by examiner

Primary Examiner—Lesley D. Morris
Assistant Examiner—Daniel Yeagley
(74) Attorney, Agent, or Firm—Sand & Sebolt

(57) ABSTRACT

A carrier assembly for a fifth wheel mounted on a semi-trailer tractor includes a pair of generally parallel spaced rail assemblies, each comprising a bed plate, a rack of teeth superimposed over the bed plate and a rack cover plate superimposed over the rack of teeth. Bolts extend through the rack cover plate, rack of teeth and bed plate. A slider assembly includes a pair of spaced generally parallel axial elements superimposed over respective bed plates and connected by a transverse element. The slider assembly supports a tooth engaging mechanism that selectively engages the rack of teeth and is spring biased and mechanically biased toward a locked position. Rear stops are removably attached to the carrier assembly. Projections on the bed plate and rack cover plate extend into apertures in the rack of teeth to resist shear forces.

17 Claims, 16 Drawing Sheets

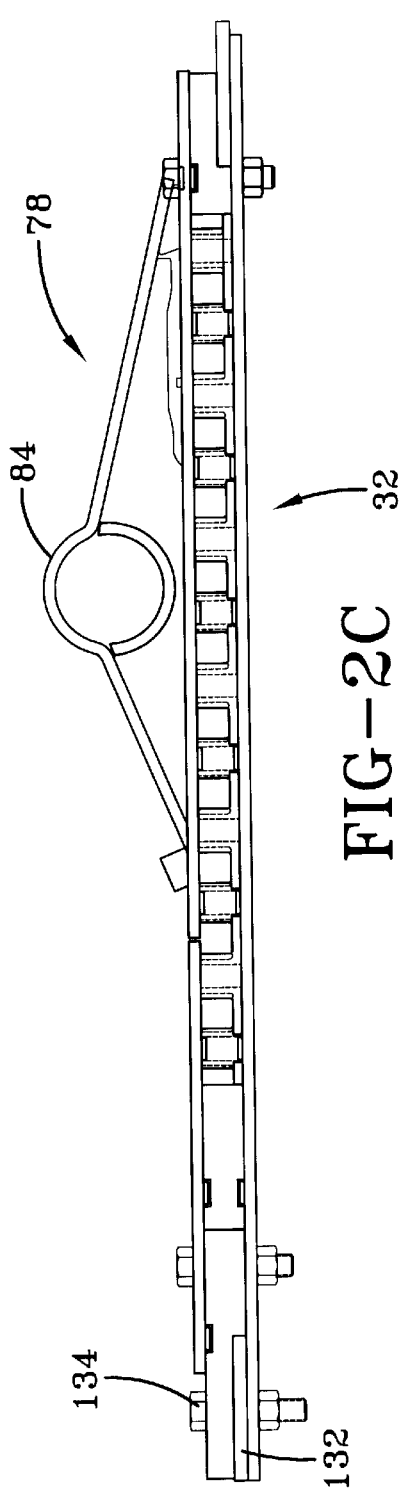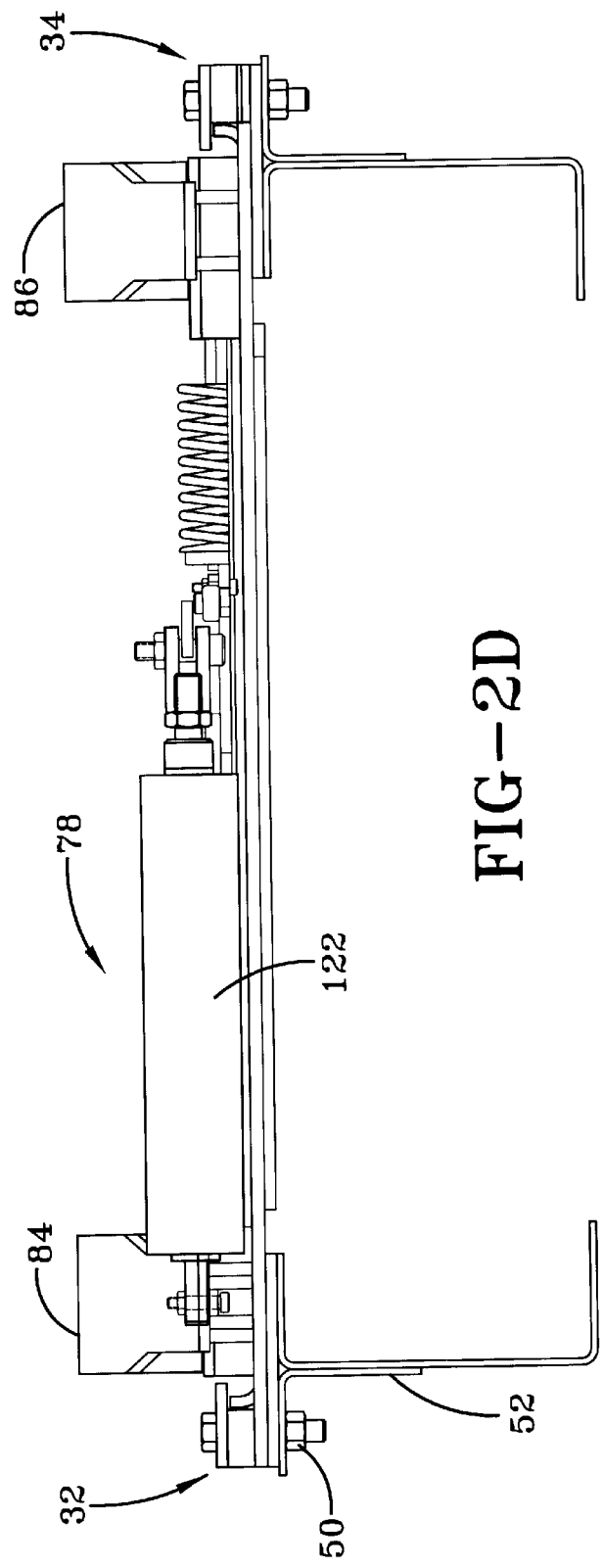

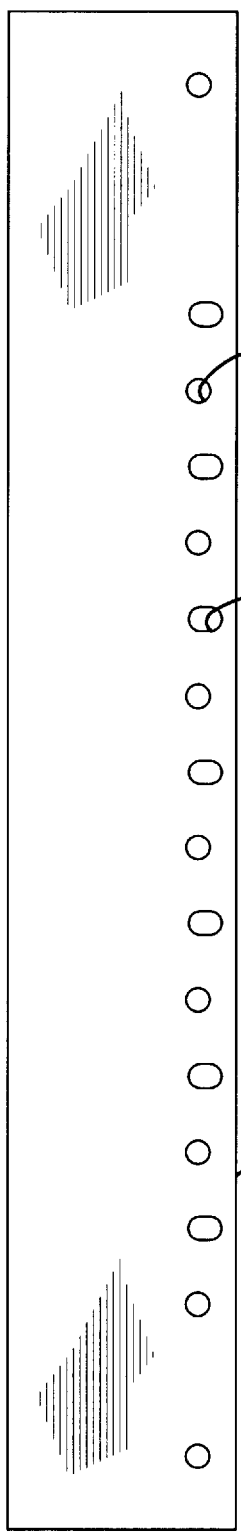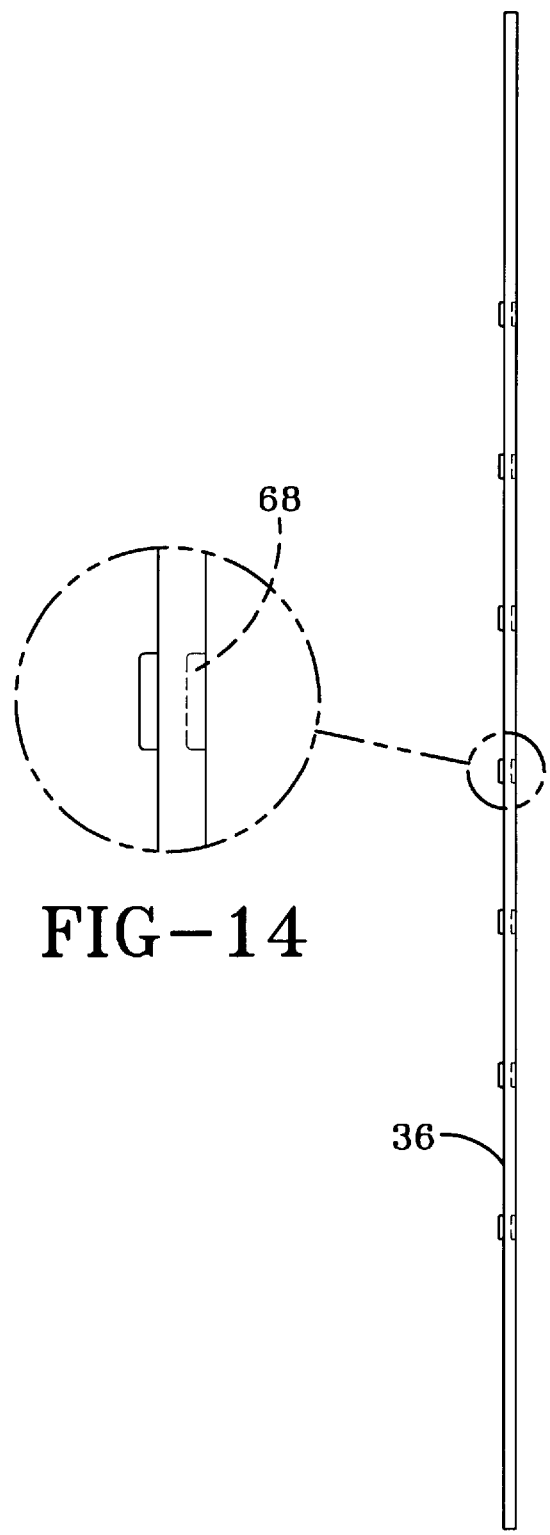
FIG-14
FIG-12
FIG-13

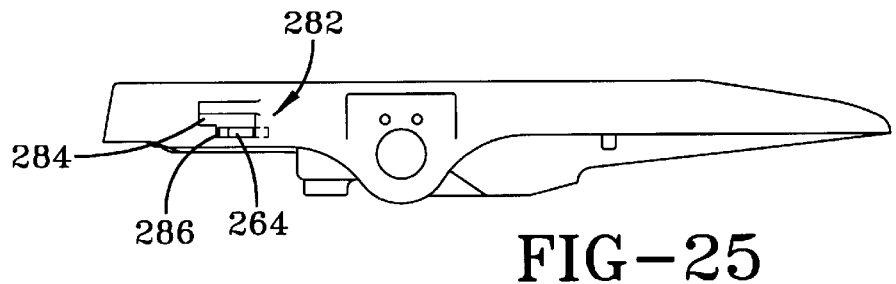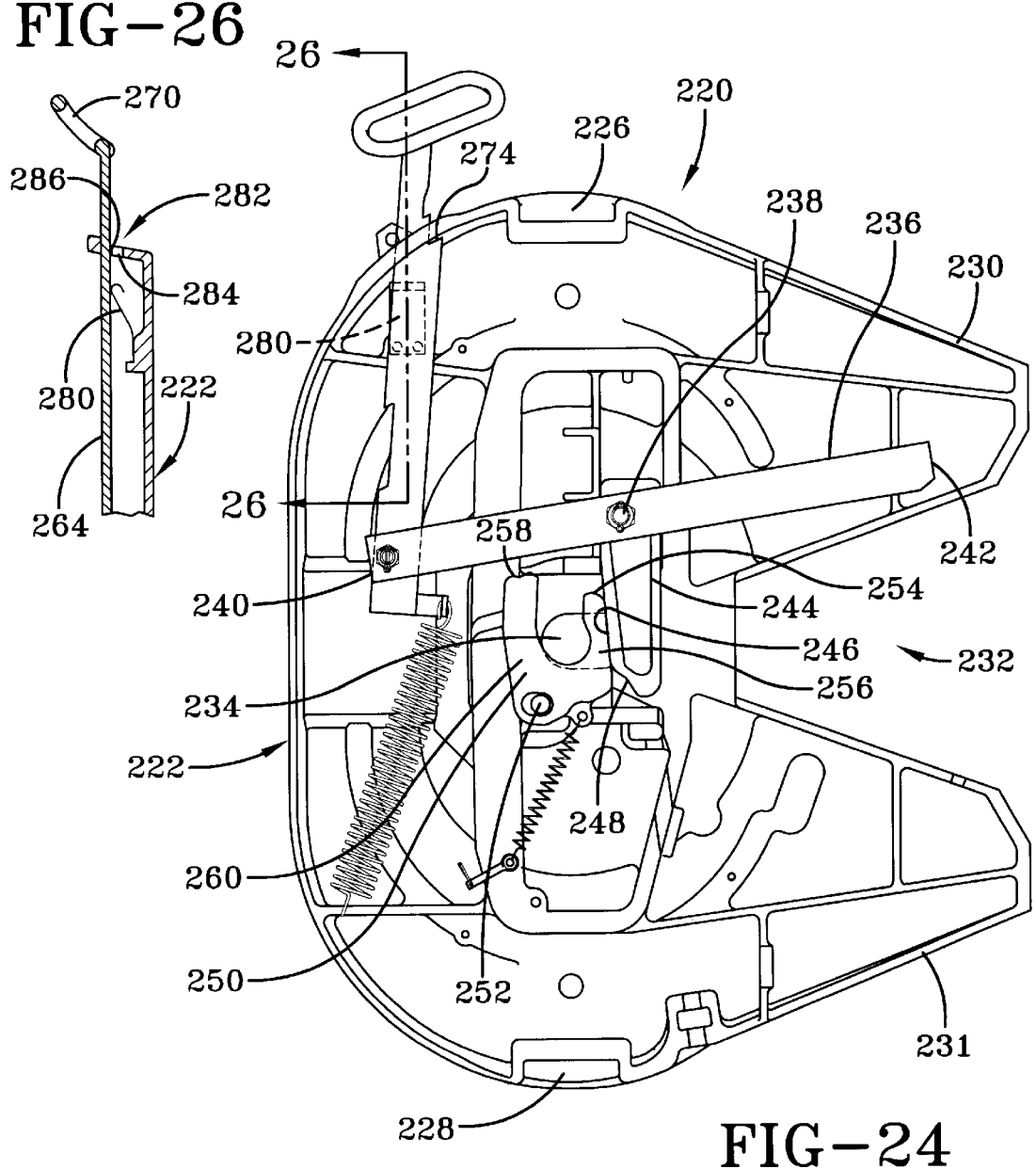

CARRIER ASSEMBLY FOR A FIFTH WHEEL

CROSS REFERENCE TO RELATED APPLICATIONS

This application is a divisional of nonprovisional application Ser. No. 09/613,329, now abandoned, filed Jul. 7, 2000, which claimed priority from provisional application Ser. No. 06/186,838 filed Mar. 3, 2000. This application incorporates by reference the disclosures of both of these applications.

BACKGROUND OF THE INVENTION

1. Technical Field

This invention relates generally to fifth wheel assemblies for coupling semi-trailers to tractors. More particularly the invention relates to an adjustable fifth wheel carrier assembly for precisely positioning a fifth wheel.

2. Background Information

Large highway freight trailers are usually coupled to an associated tractor by means of a fifth wheel assembly whereby the tractor rear drive axles directly support a portion of the trailer load burden. Usually, the fifth wheel coupling and support point is located along the length of the tractor between the rear drive wheels and the front steering wheels thereby distributing the front trailer burden between the driver and the steering wheels. The exact percentage of load desirably placed upon the front steering wheels is a variable dependent upon many factors including the axle loading road surface, the tractor equipment, the weather, the weight of the trailer and the preference of the driver.

Some degree of control over these variables is provided by a fifth wheel receiver that is mounted on a slide carrier assembly. The carriage assembly is rail guided and includes an anchoring mechanism for securing the slidable assembly at the desired point along the tractor length between the driving and steering wheel axles.

In fifth wheel carrier assemblies heretofore in use, the parallel rail assemblies have been welded to an angle that is bolted to the frame of the tractor. This arrangement is inconvenient for original equipment manufacturer, (O.E.M.) installation and may result in welds which may be non-uniform and possible damage to the tractor body when it becomes necessary to remove and replace the carrier assembly. Replacing the carrier assembly, which is fixed to the tractor in this way, also usually necessitates the use of a relatively centralized maintenance facility for this procedure. A need, therefore, exists for a way to assemble and mount the fifth wheel carrier assembly on a tractor at other locations and to do so without the detriments related to welding.

Heretofore, such fifth wheel carrier assemblies have also conventionally been provided with a stop feature that prevents rearward movement of the slider assembly. These stop features have usually been welded to the rail assembly.

Many O.E.M. fifth wheel installations are ordered for dealer inventory and showrooms. When a purchaser is identified, it is often necessary (due to customer specifications) to change the fifth wheel height. Thereby, necessitating removal of this carriage assembly. A need, therefore, exists to provide easy removal of the rear stop to facilitate an easy change in fifth wheel height.

A second disadvantage to such construction is that quality concerns with the welds and cracks may develop after use in the field. A need exists, therefore, for a way to place such stop features which avoids these problems.

Another problem which has sometimes been experienced with the prior art systems is that substantial resistance to moving the slider assembly on the rail assemblies may develop with the result that part wear may increase and substantially more force may be required to move the slider assembly. Accordingly, there is a need for a means to increase the ease of moving the slider assembly on the rail assemblies.

It is also found that debris may tend to infiltrate and accumulate in the carrier assembly. Such debris may necessitate increased maintenance or may reduce the life of the assembly. A need, therefore, also exists for a way to reduce or eliminate such debris infiltration.

When a semi-trailer/tractor starts and stops suddenly, large loads may be created on the fifth wheel carrier locking (plunger/rack interface) ably assembly. It is desirable to distribute these loads over several mounting bolts, thus reducing the shear load. There is, therefore, a need for a way of providing support against such shear loads.

The carriage locking device on prior art relies upon spring force to close and hold the locking plungers in. There is a need to provide a convenient way to close the locking mechanism, to identify that the lock in plungers are engaged and provide a secondary lock in device to ensure that they stay locked once closed. As the locking plungers and rack wear (through use) it is desirable to adjust for this wear.

Finally, when connecting a trailer a locking mechanism is desirable that assures the driver that it is closed, is readily inspectable to determine that it is locked and provides a secondary security to keep it closed. In many commonly used arrangements there is no such device, or if provided it often requires release of the secondary security device by the use of two hands. A need, therefore, exists for a connection and disconnection mechanism which provides a secondary security device that can be easily inspected and can be operated quickly and easily using only one hand.

SUMMARY OF THE INVENTION

It is an objective of the present invention to provide a way to fix fifth wheel carrier assemblies to the tractor and to form integrated rail elements without the necessity of welding.

It Is another objective of the present invention to provide a rear stop for a fifth wheel carrier assembly without having to weld such features onto the carrier base so that the slider assembly can be easily removed from the rail assemblies.

It is also an objective of the present invention to provide a means for more easily moving the slider assembly on the rail assembly elements of a fifth wheel carrier assembly.

It is still another objective of the present invention to provide a way to reduce or eliminate the infiltration and accumulation of debris in the carrier assembly.

It is also an objective of the present invention to provide a means for shear load sharing when a tractor moves from a linear path to a curve.

It is also an objective of the present invention to provide a slide locking mechanism that contains a secondary securing mechanism that is readily inspectable for proper locking and ensures that it remains locked.

It is still a further objective of the present invention to provide a means for quickly and easily operating the connection and disconnection mechanism on the fifth wheel assembly.

In one embodiment of the present invention there is a carrier assembly for a fifth wheel mounted on a semi-trailer tractor in which there are a pair of generally parallel spaced rail assemblies. Preferably each of these rail assemblies comprises a bed plate, a rack of teeth superimposed over said bed plate and a rack cover plate superimposed over said rack of teeth and a plurality of vertical axially spaced bolting means extending through said rack cover plate, rack of teeth and base bed plate. The assembly also includes a slider assembly comprising a pair of spaced generally parallel axial elements each of which is superimposed over one of said bed plates. There is also a transverse element connecting said generally parallel axial elements and supporting a tooth engaging means for selectively employing the rack of teeth on the rail assemblies. The slider assembly may then be fixed in an axial position when said tooth engaging means are employed. Axial movement of the slider on said bed plates is also possible when the tooth engaging means are not employed to permit a positional adjustment of said fifth wheel on the trailer. In this embodiment the rail assembly is connected to the tractor by bolting means which preferably will also be used to form the bed plate, rack of teeth and rack cover plate into an integral rail assembly. The disadvantages of welding the rail assemblies to the tractor are thereby avoided.

Another embodiment of the invention comprises a carrier assembly in which there are a pair of generally parallel spaced rail assemblies extending from a front end of said carrier assembly to a rear end of said carrier assembly. The slider assembly comprises a pair of spaced generally parallel axial elements each of which is superimposed over one of said bed plates, and a transverse element connects said generally parallel axial elements and supports a tooth engaging means for selectively employing said rack of teeth to cause the slider to be fixed in an axial position when said tooth engaging means are employed. Axial movements of said slider on said bed plates is possible when said tooth engaging means are not employed to permit a positional adjustment of said fifth wheel on the trailer. A rear stop is bolted to the rail assemblies by means of this invention, so that the slider assembly can be easily removed from the rail assemblies.

In another embodiment of the present invention, there is also a pair of generally parallel spaced rail assemblies on which a slider assembly, as is described above, is superimposed. To allow the slider assemblies to be moved more easily on the bed plates by increasing contact area, slidable plates which extend laterally beyond the lateral edges of the rail assemblies are interposed between the lateral elements of the slider assemblies and the bed plate.

The present invention also includes an embodiment in which there is a pair of generally parallel spaced rail assemblies extending from a front end of said carrier assembly to a rear end of said carrier assembly. Each of said rail assemblies comprises a bed plate, a rack of teeth superimposed over said bed plate and a rack cover plate superimposed over said rack of teeth. There is also a slider assembly as described above which is superimposed over the rail assemblies. The rack cover plate extends over the rack of teeth and overlaps the bed plate. Infiltration and accumulation of debris is thus avoided by this arrangement.

There is also another embodiment in which a pair of generally parallel spaced rail assemblies extending from a front end of said carrier assembly to a rear end of said carrier assembly. Each of said rail assemblies comprises a bed plate, a rack of teeth superimposed over said bed plate and a rack cover plate superimposed over said rack of teeth. The slider assembly comprises a pair of spaced generally parallel axial elements each of which is superimposed over one of said bed plates and a transverse element connecting said generally parallel axial elements and there is a tooth engaging means for selectively employing said rack of teeth on the rail assemblies to cause the slider to be fixed in an axial position when said tooth engaging means are employed and to allow axial movements of said slider on said bed plates when said tooth engaging means are not employed to permit a positional adjustment of said fifth wheel on the trailer. The rack of teeth is comprised of a plurality of generally uniform axially aligned teeth having spaces between adjacent teeth. At least one projection projects from at least one of the bed plates and the rack cover plates into an aperture formed in the rack of teeth, so as to share shear load resulting from sudden starts and stops so as to reduce shear loads at any one position.

In another embodiment an improved means of operating the connecting and disconnecting mechanism is provided. This embodiment comprises a lever, from which a lock bar extends. A "C" shaped lock jaw is retained by the lock bar in a locked position, but is biased to move to an unlocked position when the lever is pivoted to move the lock bar so as to at least partially release the lock jaw from the lock bar and allow the lock jaw to move to an unlocked position. Preferably the lever is moved by a handle that extends laterally from one of its ends outside the fifth wheel assembly.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

FIGS. 2a, 2b, 2c, and 2d are respectively a perspective, top plan, side and front view of a preferred embodiment of the carrier assembly for a fifth wheel of the present invention;

FIG. 12 is a top plan view of the bed plate used in a rail assembly of the carrier assembly shown in FIGS. 2a–2d;

FIG. 13 is a front view of the bed plate shown in FIG. 13;

FIG. 14 is a detailed view of the area in circle 14 in FIG. 13;

FIG. 24 is a bottom plan view of a fifth wheel which includes a preferred opening feature of the present inventions in a locked position;

FIG. 25 is an end view of the fifth wheel shown in FIG. 24;

FIG. 26 is a cross sectional view through 26—26 in FIG. 24;

DESCRIPTION OF THE PREFERRED EMBODIMENTS

Figure 1:
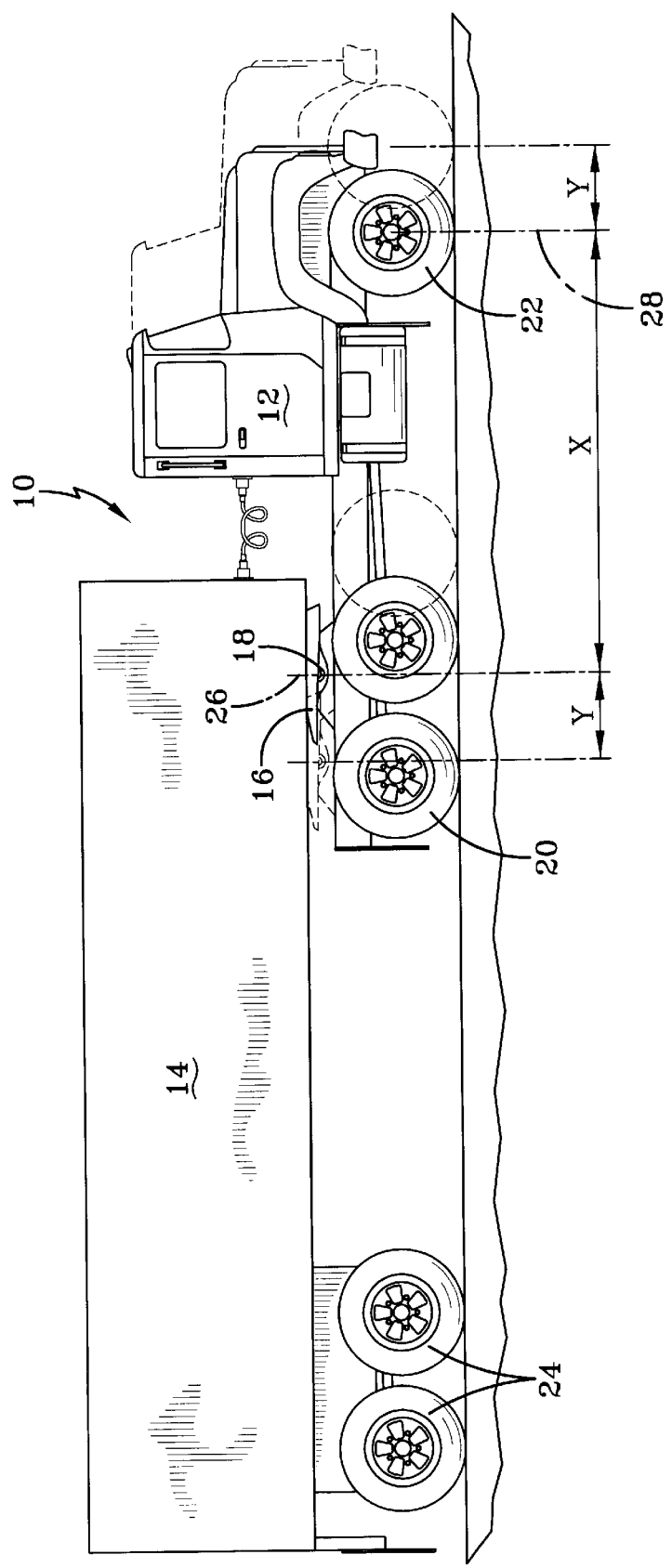
FIG. 1 is a side elevational view of a tractor trailer combination on which various aspects of the present invention are illustrated.

Referring to FIG. 1, a highway tractor-trailer unit 10 is shown to include a powered tractor 12 and a trailer 14 connected by a fifth wheel hitch assembly 16 for relative articulation about a vertical axis. As is explained in greater detail hereafter, the fifth wheel is mounted on a carrier assembly 18. Propulsive power of the tractor unit 12 is delivered to driving wheels 20. Tractor directional steering is controlled by front wheels 22. Trailer secured wheels 24 carry the aft end of the trailer load and are served by a braking mechanism that may be engaged independently of the tractor wheel brakes.

To illustrate the objective of a position adjustable fifth wheel unit 16 the value X is shown as the distance between the fifth wheel vertical hitch axis 26 and the tractor steered wheel plane 28. If the fifth wheel hitch axis 26 is shifted to the aft of the tractor by a distance Y the percentage of trailer load carried by the tractor steering wheels is correspondingly reduced and the load carried by the tractor driving wheels 20 is increased.

Figure 2A:
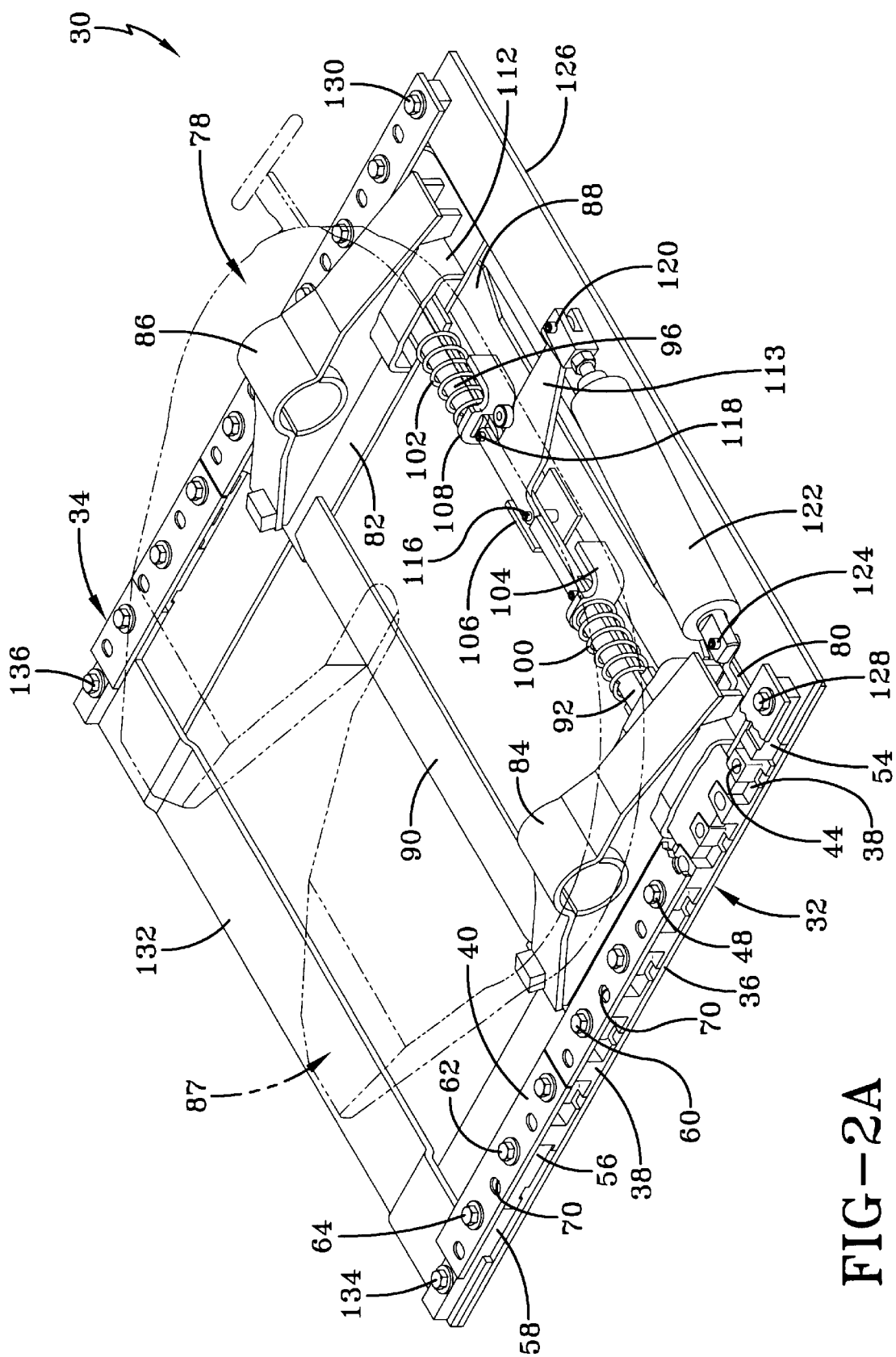
Figure 6:
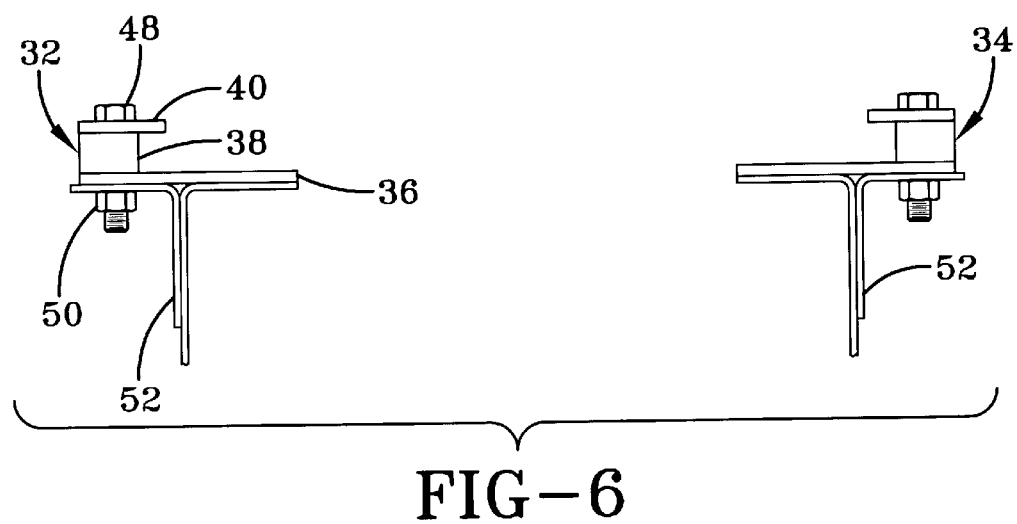
FIG. 6 is a schematic end view of a pair of rail assemblies along with relating apparatus used in the carrier assembly of the present invention.
Figure 7:
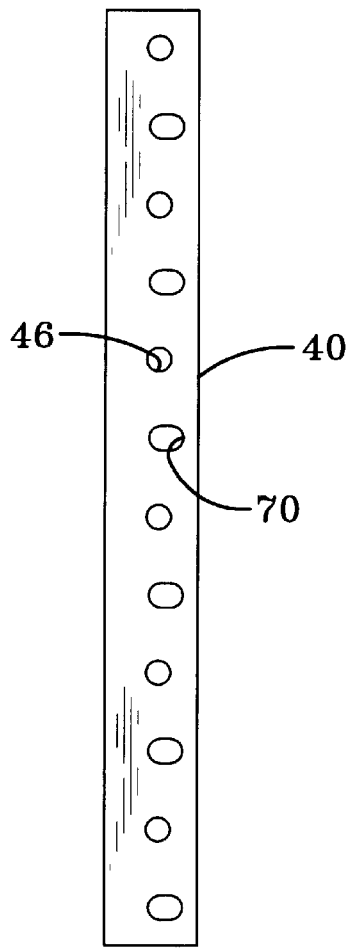
FIG. 7 is a top plan view of a rack cover plate used in a rail assembly of the carrier assembly shown in FIGS. 2a–2d.
Figures 8, 9:
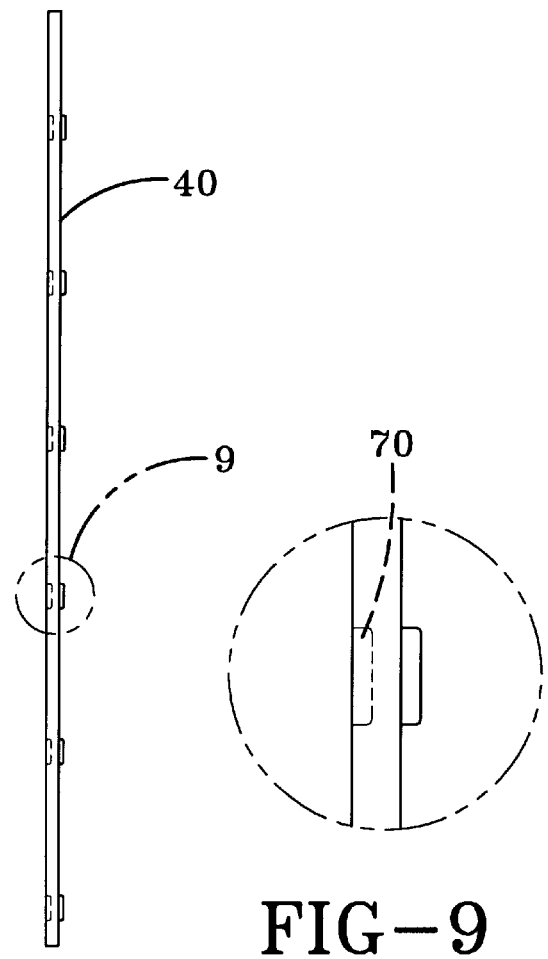
FIG. 8 is an end view of the rack cover plate shown in FIG. 7.
FIG. 9 is a detailed view of the area in circle 9 in FIG. 8.

Referring to the figures generally and in particular to FIGS. 2a–2d and 3, the carrier assembly is shown generally at numeral 30. This carrier assembly 30 has a base made up of spaced parallel rail assemblies 32 and 34. Each rail assembly 32 and 34 includes a bed plate 36, an integral rack of teeth 38 and a rack cover plate 40. Bed plate 36 defines a plurality of bolt receiving apertures 42 (FIG. 12). Rack of teeth 38 defines a plurality of apertures 44 aligned with respective apertures 42 on bed plate 36. Rack cover plate 40 defines a plurality of bolt receiving apertures 46 aligned with respective apertures 42 and 44 in bed plate 36 and rack of teeth 38. These aligned apertures 42, 44 and 46 receive bolts 48 engaged with respective nuts 50 (FIGS. 2d and 6). These bolt and nut combinations allow rail assemblies 32 and 34 to be formed as an integral unit and also attach them to frame 52 (FIGS. 2d and 6) of tractor 12 and thereby avoid welding. Rail assemblies 32 and 34 also include shear resistance spacers 54 and 56 and bracket 58 which are connected to carrier assembly 30 respectively by bolts 128, 62 and 64. These bolts are also connected by nuts as at nut 66 in the case of bolt 64. As will be explained in greater detail hereafter, there are also extrusion apertures 68 formed in bed plate 36 and extrusion apertures 70 formed in rack cover plate 40.

Figure 10:
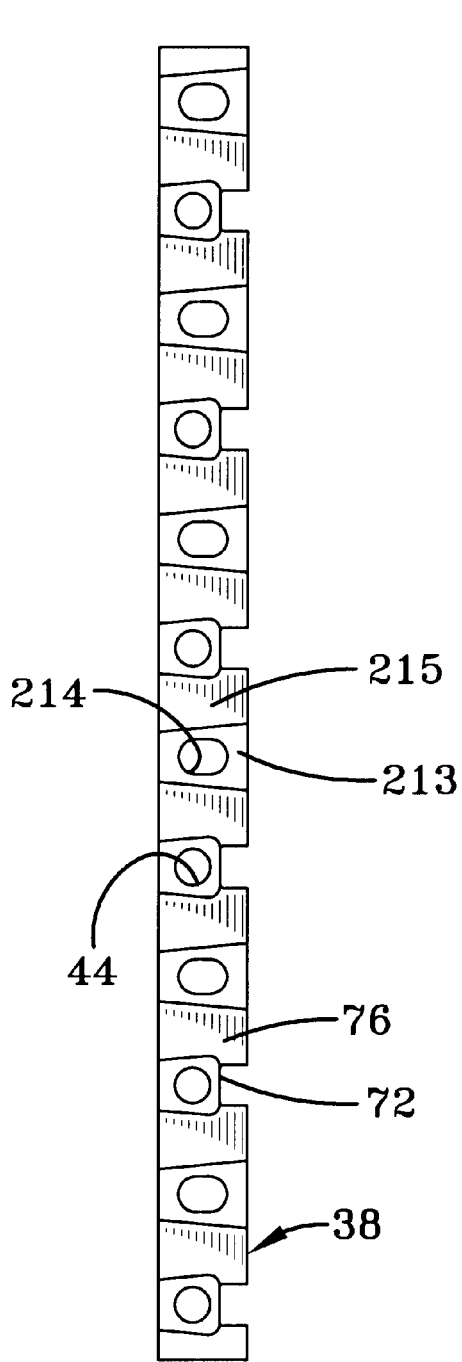
FIG. 10 is a top plan view of the integral rack used in a rail assembly of the carrier assembly shown in FIGS. 2a–2d.
Figure 11:
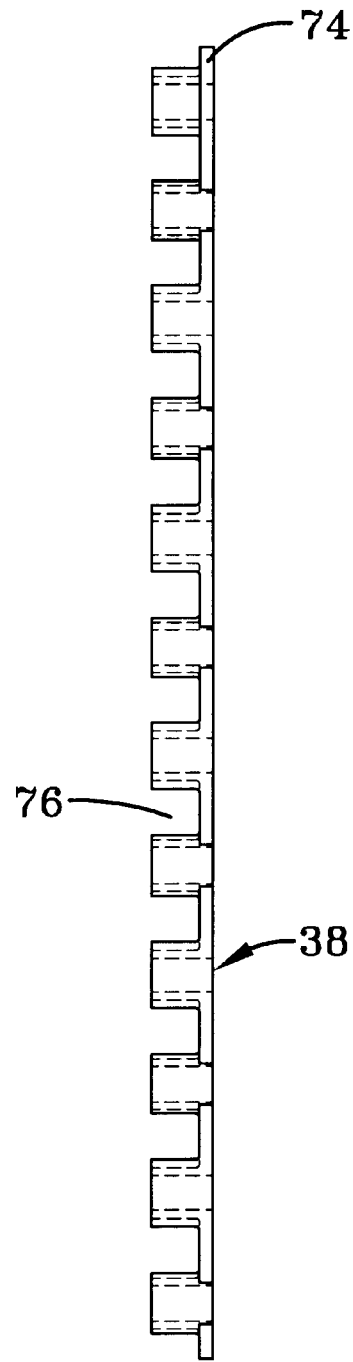
FIG. 11 is a front elevational view of the integral rack shown in FIG. 10.
Figure 15:
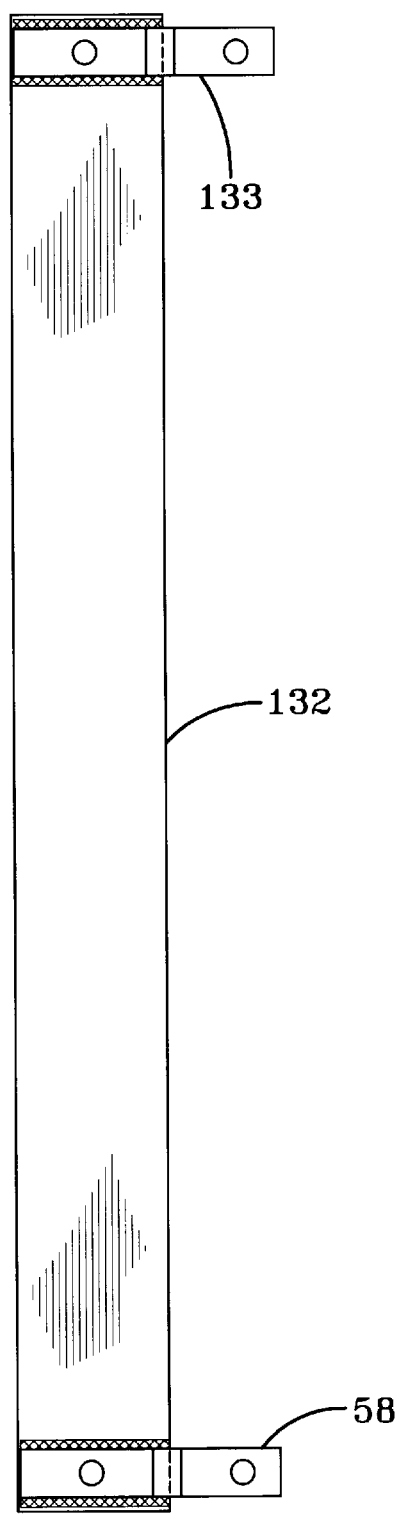
FIG. 15 is a top plan view of a rear stop used in the carrier assembly shown in FIGS. 2a–2d.
Figure 16:
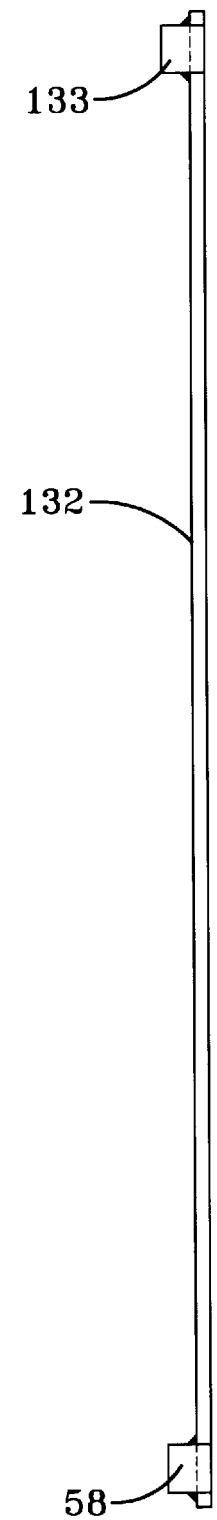
FIG. 16 is an end view of the rear stop shown in FIG. 15.

Referring to the drawings generally and particularly to FIGS. 10–11, it will be seen that the integral rack has a plurality of teeth as at tooth 72 mounted on a plate 74. Between the teeth there are intermediate spaces as at space 76. It will be understood that the plate 74 is integral with the teeth and may be either below or above them.

Figure 2B:
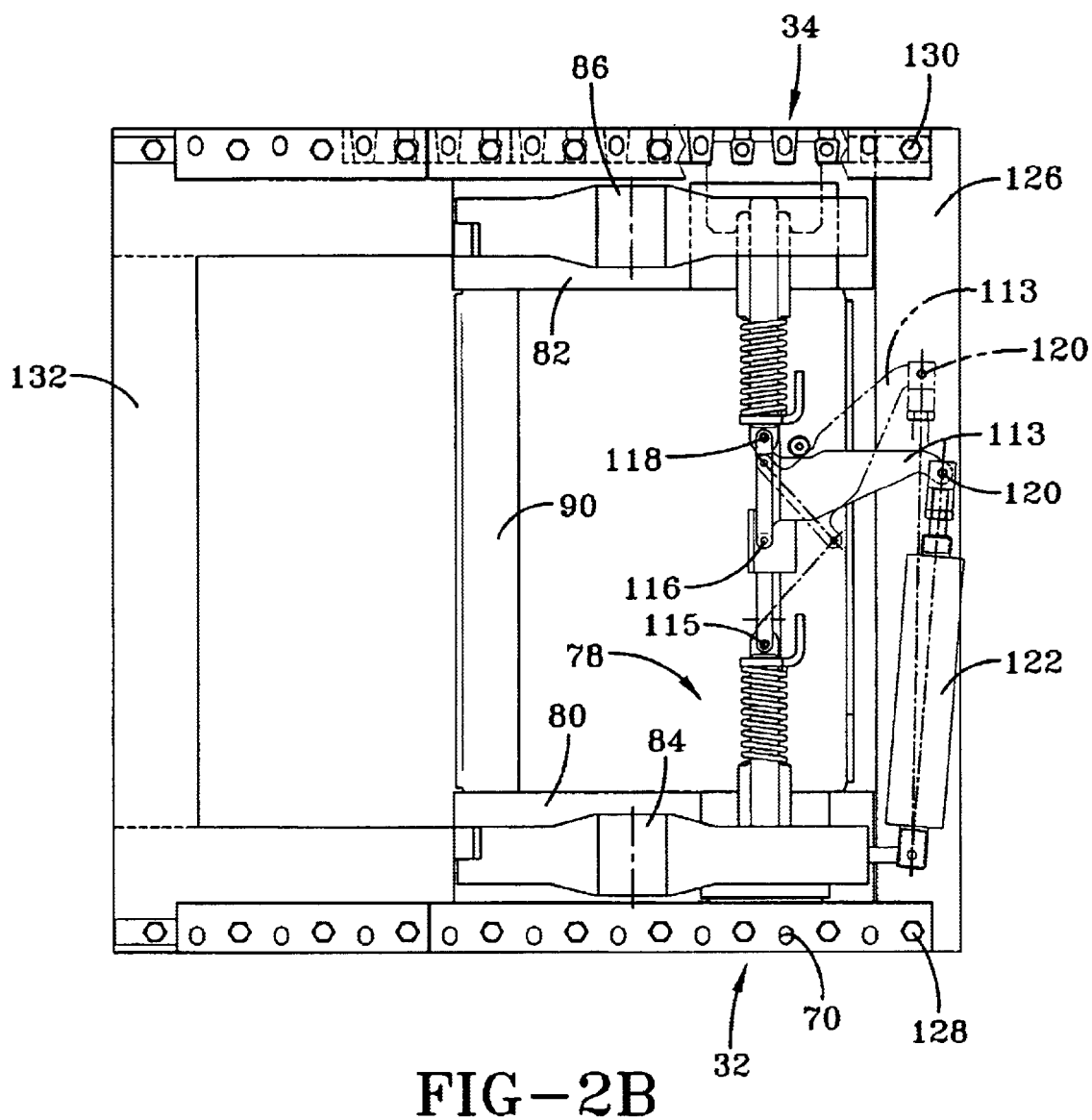
Figure 3:
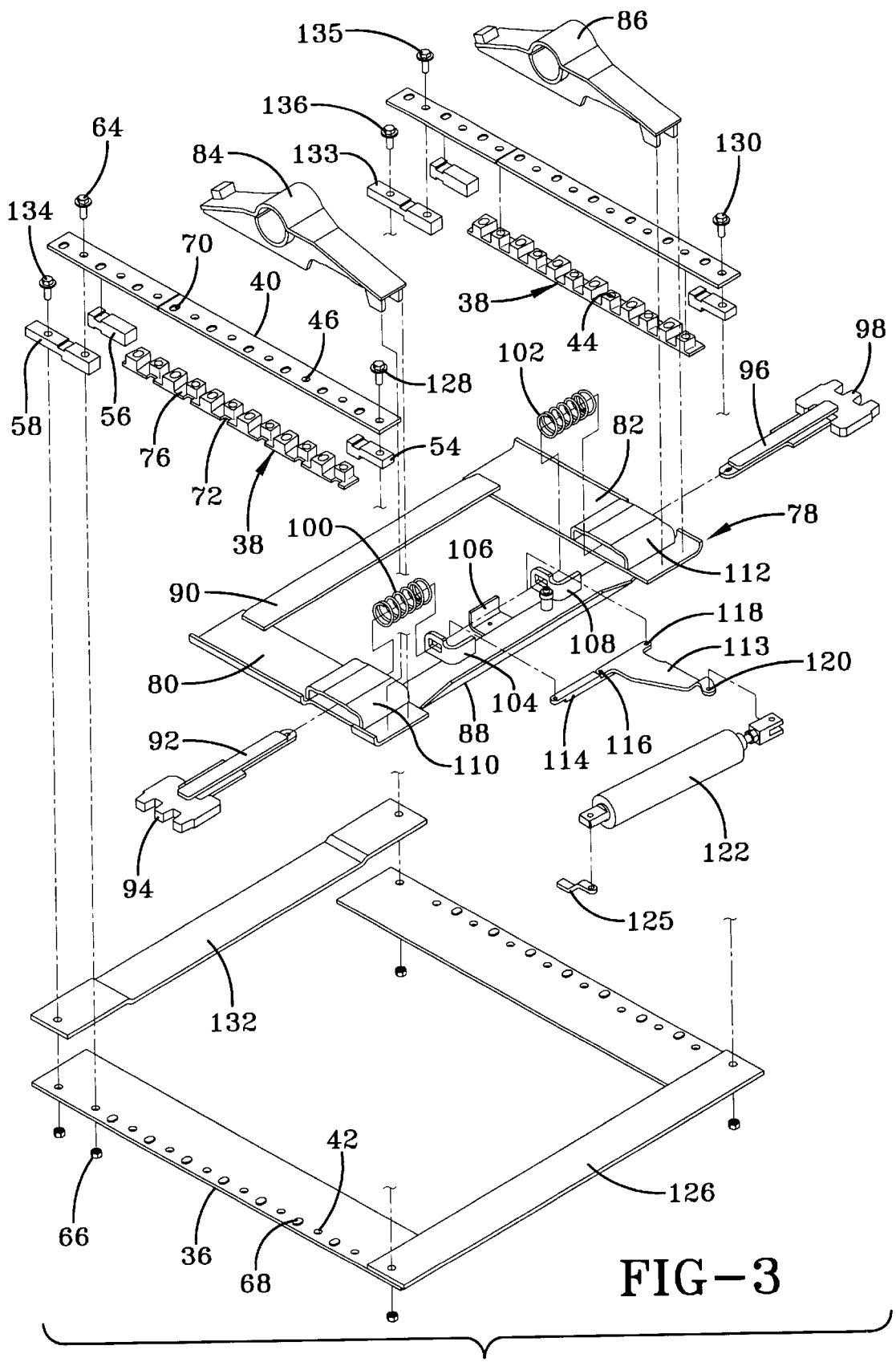
FIG. 3 is a perspective exploded view of the carrier assembly shown in FIGS. 2a–2d.

Referring again to the drawings generally and in particular to FIGS. 2a–3, the slider assembly is shown generally at numeral 78. Included in the slider assembly 78 there is a pair of generally parallel axial members 80 and 82. On each of these axial members there are respectively mounting brackets 84 and 86 for mounting the fifth wheel which is shown in FIG. 2 in phantom lines at numeral 87. The mounting brackets 84 and 86 may preferably be welded directly to the parallel axial members 80 and 82 respectively. The slider assembly 78 has medial transverse members 88 and 90. On transverse member 88 there is mounted lateral arm 92 which has distal fingers as at finger 94. In opposed relation to lateral arm 92 there is a lateral arm 96 having distal fingers as at finger 98. Restraining lateral arms 92 and 96 respectively from moving inwardly are springs 100 and 102, which bias arms 92 and 98 and fingers 94 and 96 toward engagement with rack of teeth 38. Motion of lateral arms 92 and 96 is controlled in part by guide features as at features 104,106, 108, 110, and 112. There is also a pivot plate 113 and a mounting bar 114 pivotally connected to pivot plate 113 at a pivot point 116. Lateral arm 92 is pivotally mounted on mounting bar 114 at a pivot point 115 (FIG. 2-B) while lateral arm 96 is pivotally mounted on pivot plate 113 at pivot point 118. On pivot plate 113 there is also a forward pivot point 120 at which pivot plate 113 is pivotally connected to a spring biased piston and cylinder combination 122. This piston and cylinder combination 122 is connected at its opposed end to member 80 of the slider assembly through member 125 (FIG. 3). Preferably, the piston and cylinder combination 122 is a pneumatic piston and cylinder combination. This piston and cylinder combination 122 is spring locked biased and centers pivot plate 113 adjacent pivot point 116 onto guide feature 106 which serves as a stop. As clearly shown in FIG. 2B, piston and cylinder combination 122 is compressed and extended to move pivot plate 113 and mounting bar 114 between locked and unlocked positions and arms 92 and 96 and fingers 94 and 98 between respective engaged and disengaged positions. Guide feature or stop 106 is positioned to limit the travel of pivot plate 113 and mounting bar 114 to assist in holding the locking mechanism in the locked position. In addition, springs 100 and 102 bias the locking mechanism toward the locked position. Piston and cylinder combination 122 may also provide a spring bias toward the locked position. The connection of fingers 94 and 98 with each rack of teeth 38 respectively can be ascertained by visual inspection. It will be appreciated that a positive engagement is provided between each rack of teeth 38 and respective fingers 94 and 98 which does not rely solely on spring force. An automatic spring biased arrangement is thus provided for locking the carrier assembly, which compensates for tooth wear and construction inconsistencies. It will also be appreciated that this arrangement is a positive mechanical spring biased mechanism that securely maintains the carrier assembly in a locking position when it is engaged. Connecting rail assemblies 32 and 34 is a front transverse member 126 connected to bed plates 36 by welding. Bolts 128 and 130 also serve to hold rack cover plates 40 to the rest of rail assemblies 32 and 34 respectively. Also connecting rail assemblies 32 and 34 is a rear stop member 132 from which extend brackets 58 and 133, which are connected to rail assemblies by means of bolts 64 and 134 on bracket 58 and bolts 135 and 136 on bracket 133.

Figure 4:
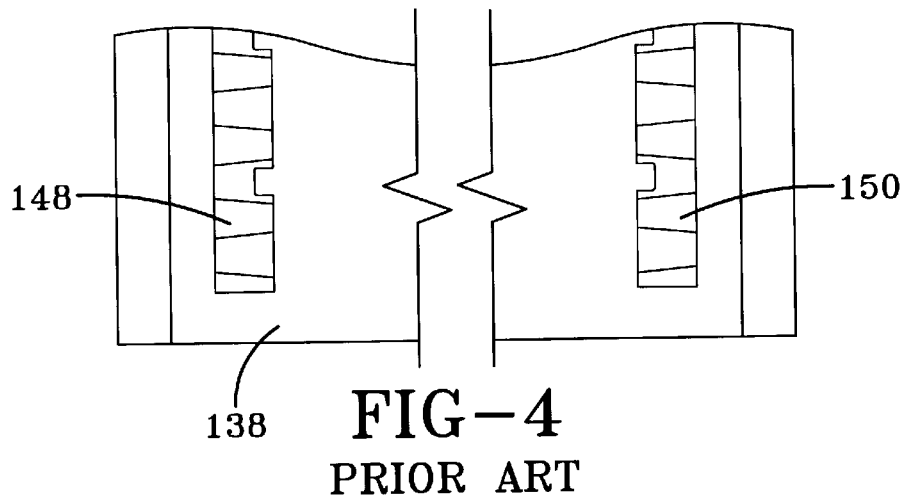
FIG. 4 is a top plan schematic view of a pair of rail assemblies used in a prior art carrier assembly.
Figure 5:
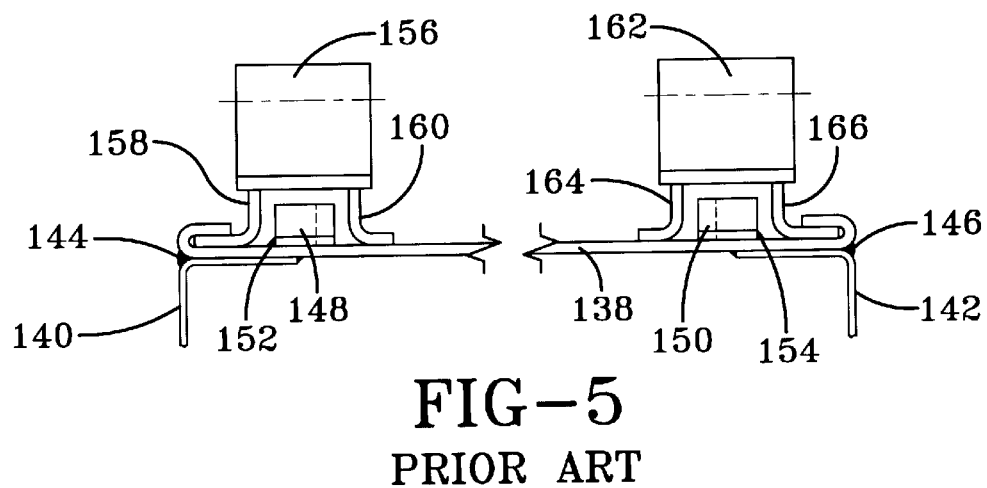
FIG. 5 is an end view of a prior art rail assemblies shown in FIG. 4.

Differences between carrier assembly 30 and the prior art are explained with reference to FIGS. 4–5 and 17–18 and FIG. 22. Referring particularly to FIGS. 4–5, the prior art method of welding the rail assemblies is explained in greater detail as follows. Such an arrangement includes a bed plate 138, which is welded to lateral mounting angles 140 and 142 by means of weld points 144 and 146. Parallel racks of teeth 148 and 150 are welded onto bed plate 138 by welds 152 and 154 respectively. A slide element 156 on the slider assembly is moved on bed plate 138 on brackets 158 and 160. Similarly a lateral slider element 162 on the slider assembly is moved on bed plate 138 on brackets 164 and 166. Comparing this prior art arrangement with the apparatus of the present invention shown in FIG. 6, it will be appreciated that certain advantages are available with the apparatus of the present invention. First, in this prior art apparatus, welding the carrier assembly to the mounting angles is necessary. In the carrier assembly of the present invention, on the other hand, the rail assemblies 32 and 34 may be fixed to the tractor frame 52 by means of bolts and nut combinations as, for example, bolt 48 and nut 50. Another advantage of the present invention is also apparent from a comparison of FIGS. 4 and 5 with FIG. 6. It will be appreciated that in FIG. 6 the rack cover plate 40 extends inwardly over the rack of teeth 38 to overlap the bed plate 36. This overlap by the rack cover plate 40 reduces or eliminates the infiltration and accumulation of debris in rail assemblies 32 and 34.

Figure 17:
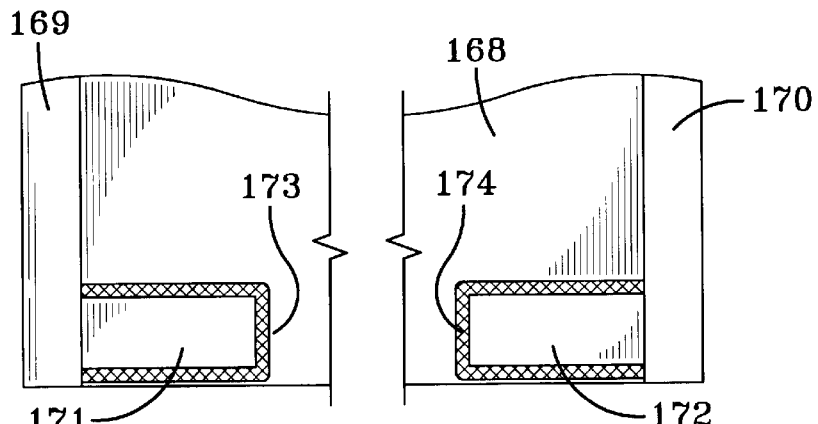
FIG. 17 is a schematic top view of a rail assembly with welded rear stops used in a prior art carrier assembly.
Figure 18:
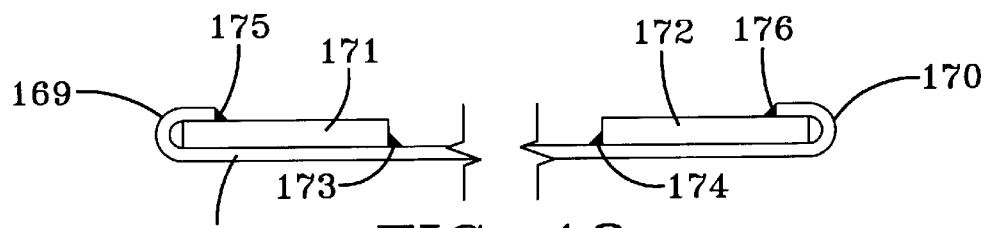
FIG. 18 is an end view of the rail assembly with welded rear stops shown in FIG. 17.
Figure 19:
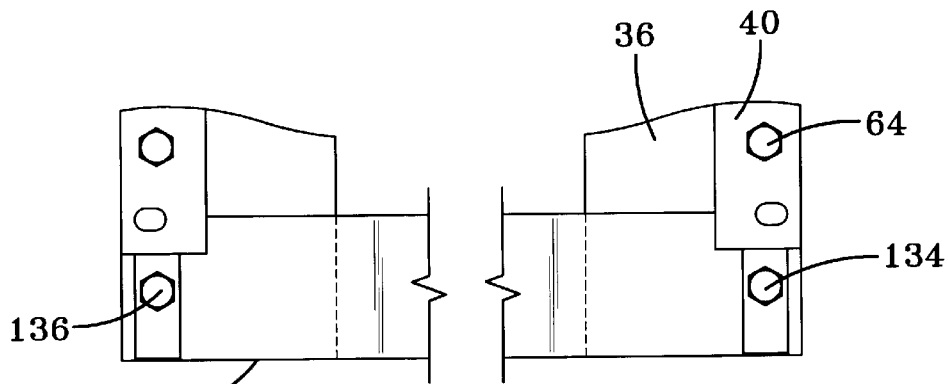
FIG. 19 is a schematic top plan view of the rail assembly with rear stop used in the carrier assembly shown in FIGS. 2a–2d.
Figure 20:
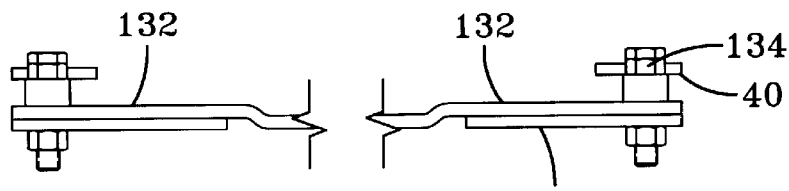
FIG. 20 is an end view of the rail assemblies and rear stop shown in FIG. 19.

Referring to FIGS. 17–18, a common prior art arrangement for providing rear stops for the slider assembly is shown. In this arrangement there is a bed plate 168 with opposed lateral slide curls 169 and 170. To stop the slider assembly there are rear stops 171 and 172. These rear stops are attached respectively to the bed plate 168 by welds 173 and 174. The rear stops 171 and 172 are also attached to the mounting angles 169 and 170 by welds 175 and 176 respectively. It would be understood in the above described prior art arrangement, it would generally be necessary to cut the welded rear stops 171 and 172 in order to remove the slider assembly from the rail assemblies. On the other hand, in the arrangement of the present invention, the transverse rear stop 132 may be easily removed without damaging the rest of the assembly by loosening its attaching bolts so as to allow the slider assembly to be removed from the rail assemblies.

Figure 22:
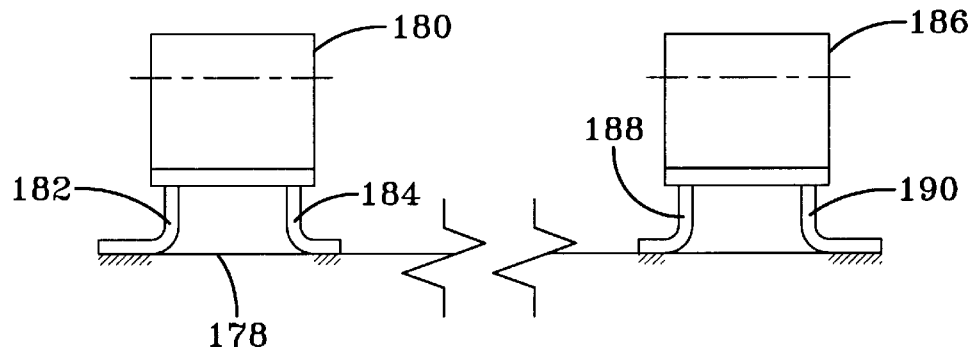
FIG. 22 is a schematic end view of a pair of rail assemblies showing slide features used in a prior art carrier assembly.
Figure 23:
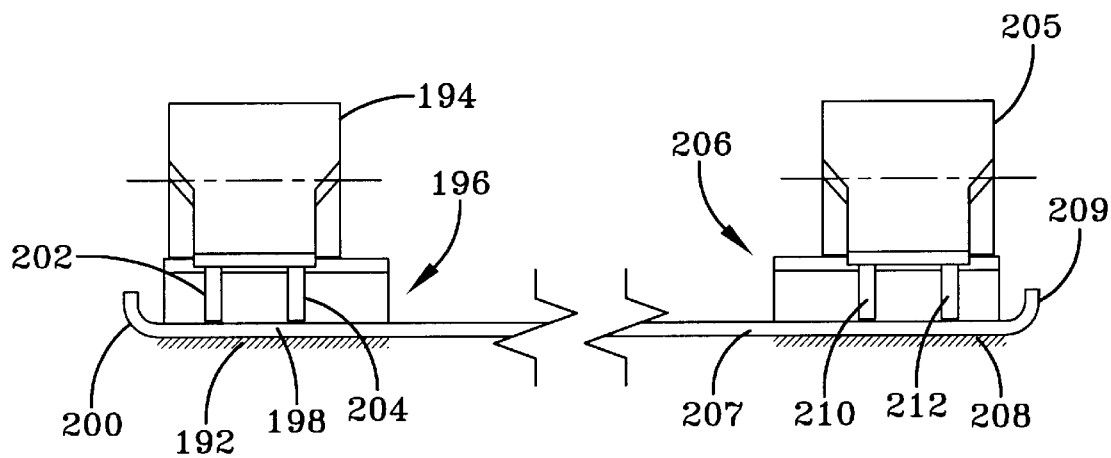
FIG. 23 is a schematic end view of a pair of rail assemblies including a slide feature as may be used in a carrier assembly as shown in FIGS. 2a–2d.

Referring to FIG. 22, a common prior art arrangement for mounting the lateral slide elements on the bed plate is shown. In this arrangement there is a bed plate 178 over which a lateral slide element 180 is superimposed. Interposed between lateral slide element 180 and the bed plate there are brackets 182 and 184 which extend first downwardly then laterally from the lateral slide element. Similarly there is an opposed lateral slide element 186 from which brackets 188 and 190 extend to rest upon the bed plate in the same way. A comparative detailed view of the preferred embodiment of the present invention is shown in FIG. 23 in which there is a bed plate 192 over which the lateral element 194 rests on a sled 196. This sled or slidable plate 196 has a flat base surface 198 which rests directly on the bed plate and an outward curved lateral surface 200. There are also vertical support members 202 and 204 between the lateral element 194 and the flat base surface 198. On the opposed side of the bed plate 192 there is another lateral element 205 which is superimposed on the sled or slidable plate 206 which also has a flat base surface 207 which rests on the other bed plate 208 which is in opposed relation to bed plate 192. There is also a curved lateral surface 209 which curves upwardly and outwardly from the bed plate. Similarly there are vertical members 210 and 212 interposed between the lateral element 205 and the flat base surface 207. It will be appreciated that in the above described embodiment of the present invention that the sleds or slidable plates 196 and 206 extend laterally beyond the sides of lateral elements 194 and 205, respectively. It will also be appreciated that surface area between sleds or slidable plates 196 and 210 and the bed plate 192 is significantly increased over prior art arrangements (as for example brackets 182, 184, 188, and 190) so as to allow the slider assembly to move with considerably greater ease and with less part wear.

Figure 21:
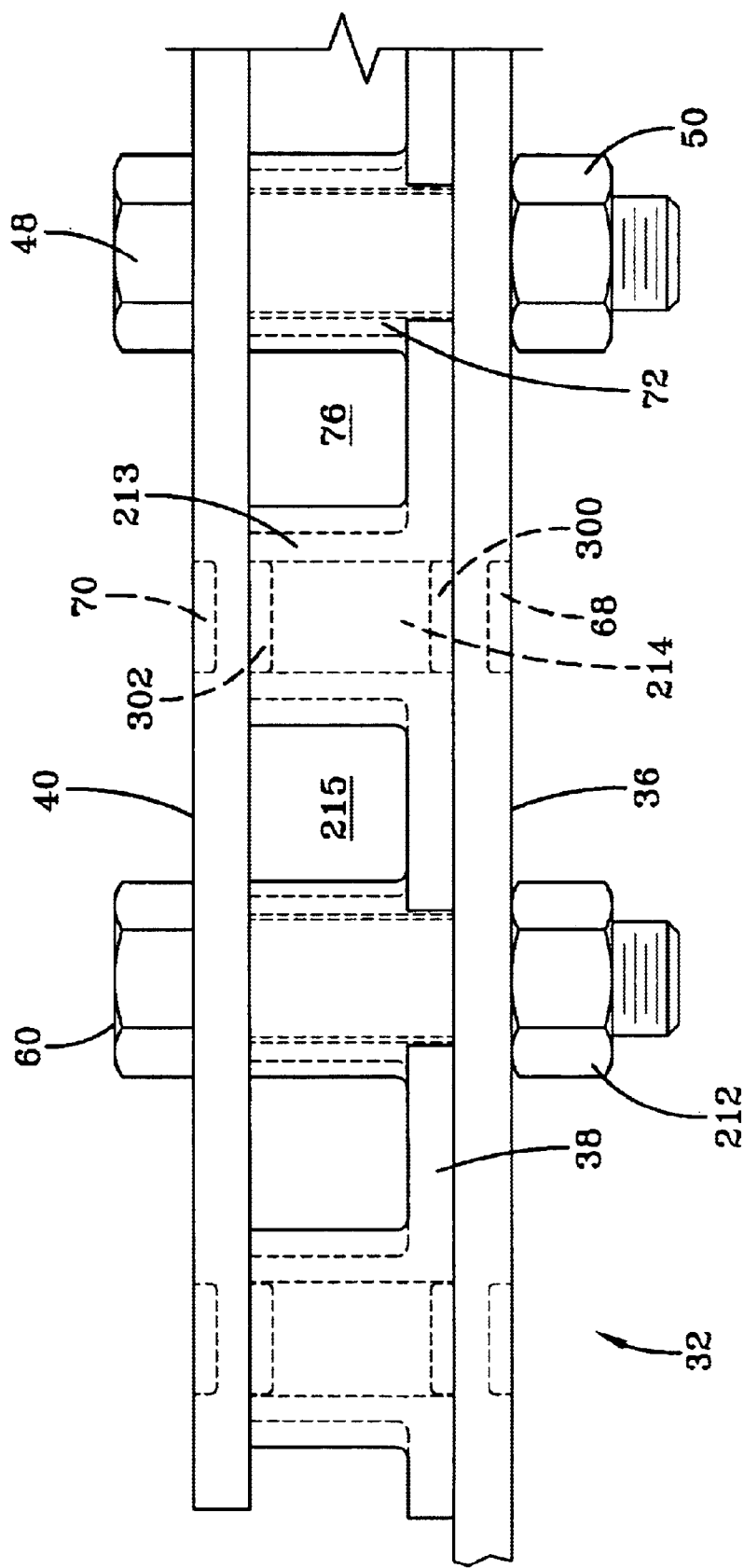
FIG. 21 is a fragmented side elevational view of a rail assembly used in the carrier assembly shown in FIG. 1.

Referring to the drawings generally and in particular to FIG. 21, another embodiment of the present invention is shown. This drawing shows a fragmented section of rail assembly 32 in which the bed plate 36, integral rack of teeth 38 and rack cover plate 40 are shown. Bolts 48 and 60 extend through the rack assembly as is described above and are secured respectively by nuts 50 and 212. Also shown are tooth 72, space 76 and tooth 213. Elongated aperture 70 in rack cover plate 40 is positioned above tooth 213, and elongated aperture 68 in bed plate 36 is positioned below tooth 213. Aperture 214 extends into tooth 213. On the opposite side of tooth 213 from space 76 there is another space 215. To provide additional resistance from shear forces when a semi trailer/tractor starts and stops suddenly, rack cover plate 40 is manipulated in the vicinity of extrusion aperture 70 to form projection 302, which projects into aperture 214, as clearly seen in FIG. 21. Force is also applied to bed plate 36 in the vicinity of extrusion aperture 68 to form projection 300, which also projects into aperture 214, as clearly seen in Fig. Referring also to FIGS. 7–13, it will be seen that there are a plurality of elongated apertures 68,214, and 70 in bed plate 36, rack of teeth 38 and rack cover plate 40, respectively. At each of these elongated apertures, bed plate 36 and rack cover plate 40 are similarly manipulated to form respective projections 300 and 302, each of which projects into a respective aperture 214.

Referring to FIGS. 24–30, an embodiment which is a locking mechanism for a fifth wheel assembly is shown. This fifth wheel assembly is shown generally at 220 and, except for the connecting and disconnecting mechanism described herein, is otherwise essentially conventional as is, for example, essentially disclosed in U.S. Pat. No. 5,746,438 to Bergmann et al. which is assigned to the assignee of this application and which is incorporated herein by reference. The assembly 220 includes a housing 222 with axial attachment points 226 and 228 for a carrier assembly. The assembly 220 also includes, as is conventional, rearwardly projecting ramps 230 and 231, a kingpin receiving gap 232 and a blind port 234. The locking and unlocking mechanism includes a lever 236 with a medial lever pivot point 238 and a front end 240 and a rear end 242 adjacent the medial lever pivot point 238. There is a lock bar 244 which has a horizontal front edge 246 and a side oblique edge 248. There is also a "C" shaped lock jaw 250 which has a pivot point 252. The lock jaw has a first end 254 on a recessed leg 256 and a second end 258 on a major leg 260. A biasing spring 262 is attached to the lock jaw 250 rearwardly from the pivot point 252. At the front end 240 of the lever it is attached to a handle 264 at pivot point 266. The handle 264 has an inner end 268 and an outer grip end 270 which is a loop configuration. The outer grip end 270 loop is obliquely configured to facilitate unlocking of the locking mechanism as is explained below. It will also be appreciated that this arrangement allows the user to easily and efficiently ascertain if the assembly 220 is properly locked by visually inspecting the handle 264. At the inner end 268 the handle 264 is attached to biasing spring 272 which resists the withdrawal of the handle 264. The handle 264 also has steps 274, 276 and 278 the function of which will be explained hereafter. There is also a leaf spring 280 which biases the handle 264 into a locked position. The handle 264 extends from the housing 222 through a handle aperture 282 which has a widened unlocked section 284 and a narrowed locked section 286. The pivoting of the lever 236 at the handle end 268 forces spring 272 to bias handle 268 into the narrowed locked section 286. The operation of the above described locking and unlocking mechanism is as follows. The locked position of the mechanism is shown in FIGS. 24–26. In this locked position the lever 236 is in an oblique position with the handle 264 in an inward position. The lock jaw 250 is in a locked position with the horizontal front edge 246 of the lock bar 244 bearing against the recessed leg 256 of the lock jaw 250. Referring particularly to FIG. 26, it will be seen that the leaf spring 280 bears against the handle 264 to maintain the handle 264 in a lower locked position. Referring particularly to FIG. 25, it will be seen that the handle 264 is in the lower locked position when in narrowed locked section 286 of the handle aperture 282.

Figure 28:
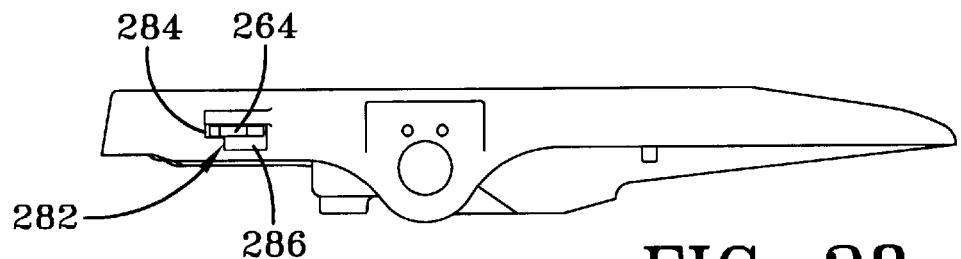
FIG. 28 is an end view of the fifth wheel shown in FIG. 27.
Figure 27:
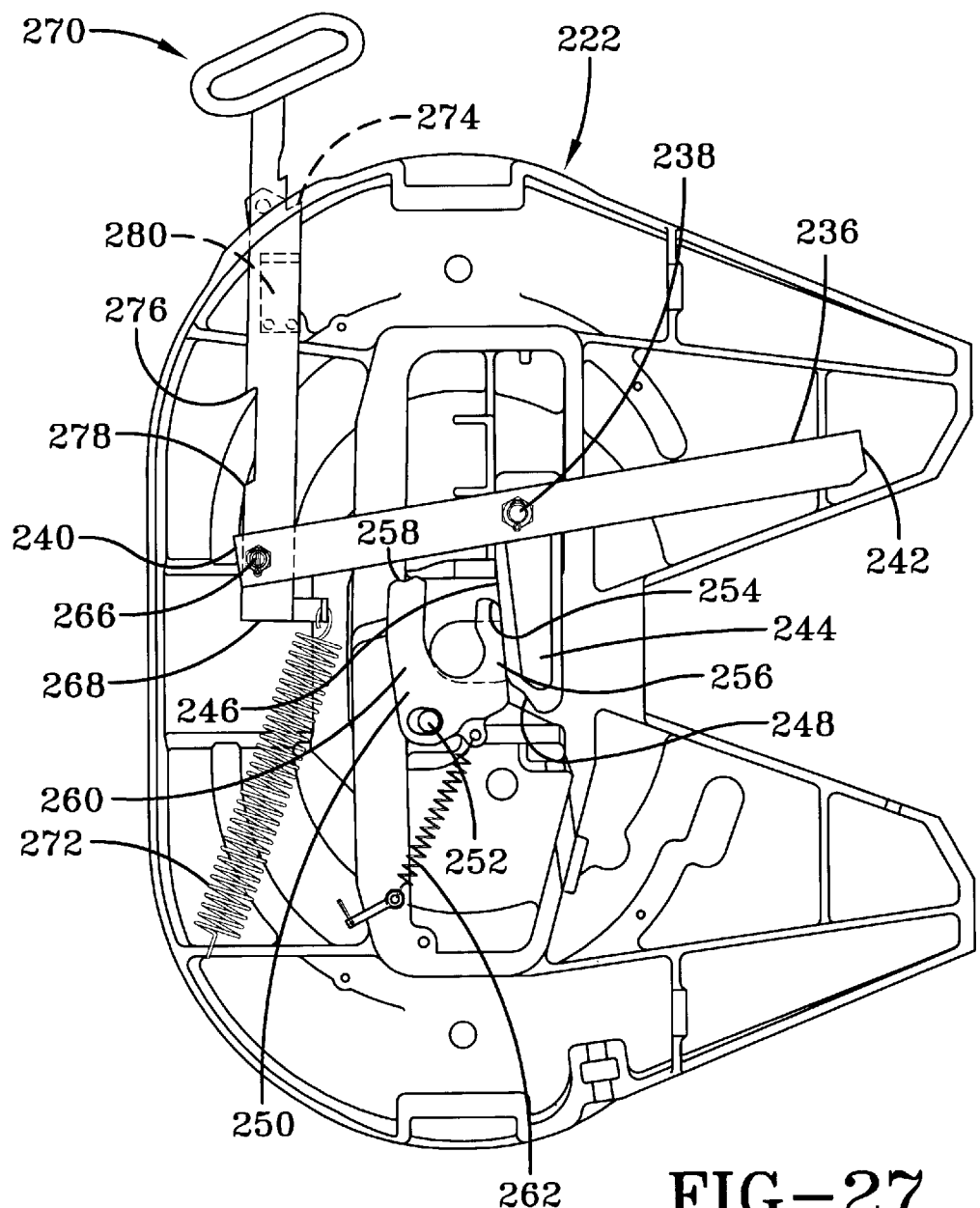
FIG. 27 is a bottom plan view of the fifth wheel shown in FIG. 24 in an intermediate opening position.

Referring to FIGS. 27–28, an intermediate stage in unlocking the fifth wheel assembly 220 is shown. The handle outer grip end 270 loop is orientated upon the handle 264 such that the effort of the driver pulling the handle loop will have a touch key to bias the handle 264 up against leaf spring 280 forcing the handle 264 into the widened unlocked section 284. This orientation of the handle loop also biases the handle 264 forward allowing step 274 to pass through widened unlocked section 284. Here force is applied against the leaf spring 280 to move the handle 264 upwardly to the widened unlocked section 284, which is in an upper position of the handle aperture 282. It will be appreciated that in this upper position it is possible for the step 274 to move through the handle aperture 282 while in the lower narrowed locked section 286 the same would not be possible.

It will be appreciated that this arrangement provides a readily apparent visual indication of whether the assembly 220 is locked or not. That is, the handle 264 will be positioned in section 284 in an unlocked position and in section 286 in the locked position.

Figure 30:
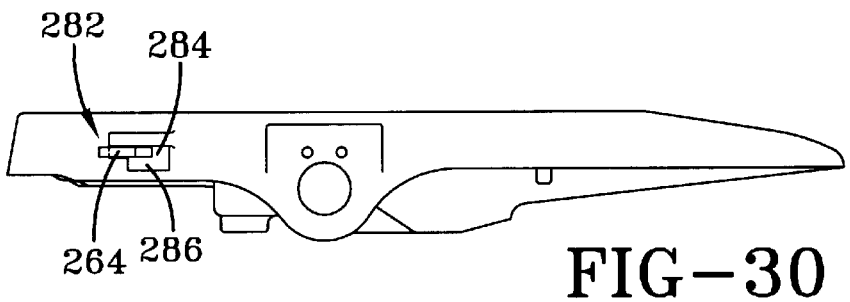
FIG. 30 is an end view of the fifth wheel shown in FIG. 29.
Figure 29:
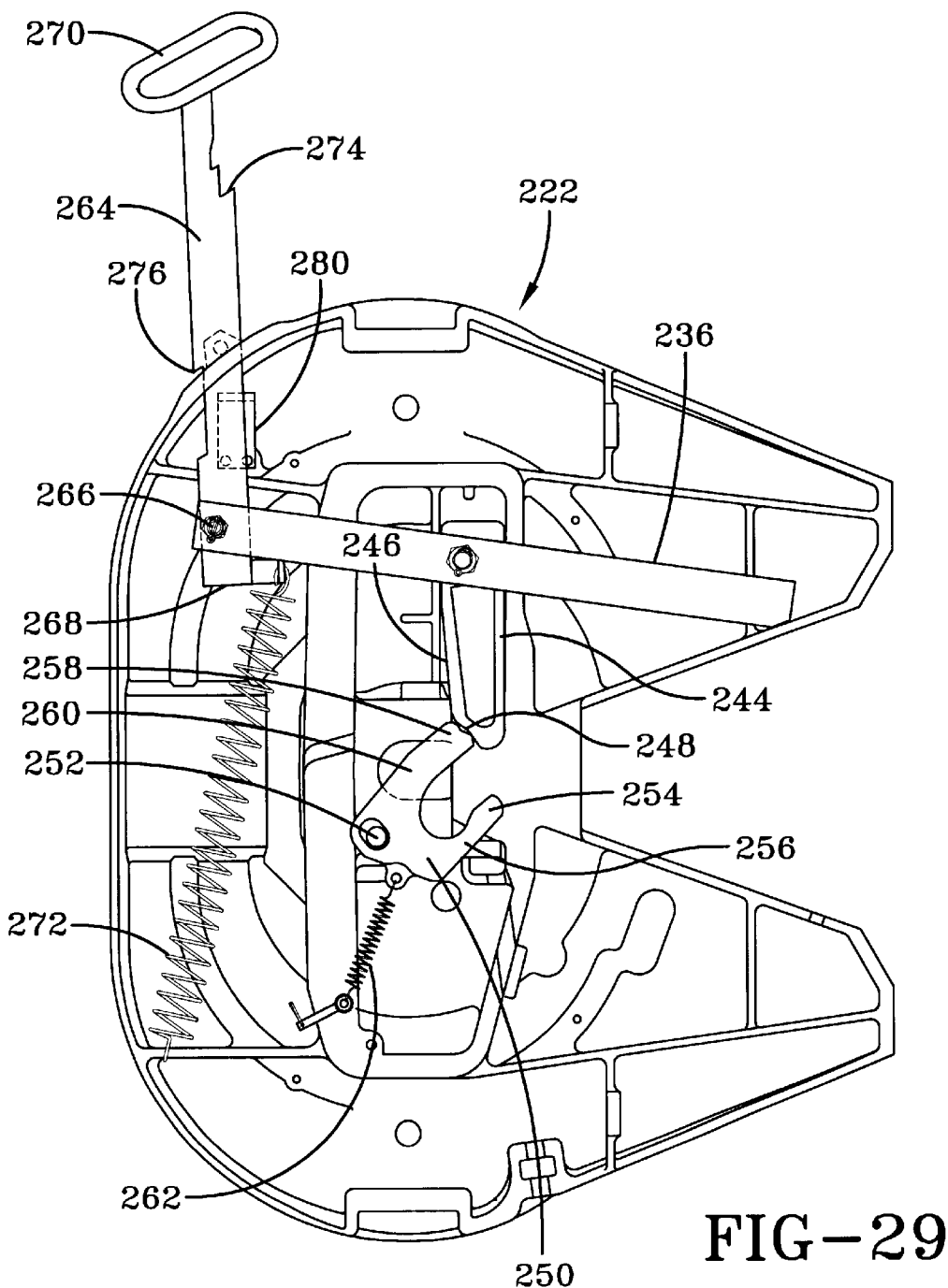
FIG. 29 is a bottom plan view of the fifth wheel shown in FIG. 25 in an open position.

Referring to FIGS. 29–30, the final step in unlocking the fifth wheel assembly 220 is illustrated. Here the handle 264 is pulled outwardly beyond step 276, pivoted forward and released so that step 276 is engaged on the housing 222. This action is performed against biasing spring 272. As the driver pulls the tractor forward, the motion of the lockjaw 250 causes leg 260 to drive lever 236 outward releasing handle 264 from step 276 on housing 222 thereby setting the locking mechanism for recoupling. It will be appreciated that this method of unlocking the fifth wheel assembly 220 is quick and efficient and will usually be able to be accomplished with one hand.

It will be appreciated that whether the assembly 220 is locked or unlocked is also readily apparent from the position of the handle 264. That is, when the step 276 engages the housing 222, the assembly 220 will be unlocked.

It will be appreciated that there has been described a carrier assembly in which the disadvantages of welding the assembly to the tractor are avoided. This carrier assembly also allows the rear stops to be easily and economically removed to facilitate removal of the slider assembly. This carrier assembly also includes features which facilitate movement of the slider assembly on the rail assembly and reduce part wear. This carrier assembly also reduces or eliminates debris infiltration into the apparatus and which shares shear loads. It will also be appreciated that means have been described which allow quick and easy connection and disconnection of the fifth wheel and which provides means for quick visual to ascertain whether the assembly in locked or unlocked.

Accordingly, the improved Carrier Assembly for a Fifth Wheel apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the Carrier Assembly for a Fifth Wheel is constructed and used, the characteristics of the construction, and the advantageous new and useful results obtained; the new and useful structures, devices, elements, arrangements, parts, and combinations are set forth in the appended claims.

What is claimed is:

1. A carrier assembly for a fifth wheel mounted on a semi-trailer tractor comprising:

a pair of generally parallel spaced rail assemblies extending from a front end to a rear end of the carrier assembly, each rail assembly comprising a rack of teeth positioned over a bed plate and a rack cover plate positioned over the rack of teeth;

a slider assembly comprising a pair of spaced generally parallel axial elements each positioned over a respective bed plate and a transverse element connecting the axial elements;

the slider assembly supporting a tooth engaging means for selectively engaging each respective rack of teeth to fix the slider assembly in an axial position when the tooth engaging means are engaged and to allow the slider assembly to move axially on the bed plates when the tooth engaging means are disengaged to permit a positional adjustment of the fifth wheel on the trailer; and at least one projection projecting from at least one of the bed plates and the rack cover plates into an aperture formed in the rack of teeth.

2. The carrier assembly of claim 1 wherein the at least one aperture is formed in a tooth on the rack of teeth.

3. The carrier assembly of claim 2 wherein the tooth has an inner surface bounding a portion of the aperture and the at least one projection has a periphery and projects into the aperture so that the periphery lies closely adjacent the inner surface.

4. The carrier assembly of claim 3 wherein there is a friction fit between the periphery and the inner surface.

5. The carrier assembly of claim 1 wherein a plurality of projections project from at least one of the bed plates and the rack cover plates into respective apertures in respective teeth.

6. The carrier assembly of claim 5 wherein at least one bed plate projection is aligned with a rack cover plate projection.

7. The carrier assembly of claim 6 wherein each bed plate projection is aligned with a rack cover plate projection.

8. The carrier assembly of claim 7 wherein each bed plate projection and aligned rack cover plate projection project into a common aperture in a tooth, said aperture extending completely through the tooth.

9. The carrier assembly of claim 6 wherein the at least one bed plate projection and aligned rack cover plate projection project into a common aperture in a tooth, said aperture extending completely through the tooth.

10. The carrier assembly of claim 5 wherein the respective bed plates, racks of teeth and rack cover plates include a plurality of aligned bolt-receiving holes and are secured by a plurality of bolts extending therethrough.

11. The carrier assembly of claim 10 wherein the apertures and the holes are formed in alternating teeth and a bolt extends through each hole and a projection extends into each aperture.

12. The carrier assembly of claim 11 wherein each aperture is a through hole into which a bed plate projection and an aligned rack cover projection project.

13. The carrier assembly of claim 12, wherein each bolt hole is generally cylindrical and each aperture is elongated.

14. The carrier assembly of claim 1 wherein a plurality of projections project from each bed plate and each rack cover plate into respective apertures in respective teeth.

15. The carrier assembly of claim 1 wherein the at least one projection has a shape complementary to the shape of the aperture in a respective tooth.

16. The carrier assembly of claim 15 wherein the at least one projection is elongated and tooth aperture is elongated.

17. The carrier assembly of claim 1 wherein the slider assembly has a pivot plate locking mechanism including a pivot plate and a mounting bar; the pivot plate being pivotally connected to one tooth engaging means and pivotally connected to the mounting bar, which is in turn pivotally connected to the other tooth engaging means; the pivot plate locking mechanism being moveable between locked and unlocked positions to move the tooth engaging means to corresponding engaged and disengaged positions.

* * * * *